(12) United States Patent
Fuller, Jr. et al.

(10) Patent No.: US 7,627,328 B2
(45) Date of Patent: Dec. 1, 2009

(54) AUDITING OF WIRELESS NETWORK NODE DATABASES

(75) Inventors: Marvin U. Fuller, Jr., Cumming, GA (US); Stephen T. Hardin, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1318 days.

(21) Appl. No.: 10/910,381

(22) Filed: Aug. 3, 2004

(65) Prior Publication Data

US 2006/0031475 A1 Feb. 9, 2006

(51) Int. Cl.
*H04W 24/00* (2006.01)

(52) U.S. Cl. ............... 455/456.1; 455/422.1; 455/456.3

(58) Field of Classification Search ................ 455/456.1
See application file for complete search history.

(56) References Cited

U.S. PATENT DOCUMENTS

| | | | | |
|---|---|---|---|---|
| 7,127,257 B2 * | 10/2006 | Riley et al. | ............... | 455/456.1 |
| 7,151,939 B2 * | 12/2006 | Sheynblat | ................ | 455/456.1 |
| 7,292,864 B1 * | 11/2007 | Al-Khashti et al. | ...... | 455/456.1 |
| 2002/0043037 A1 * | 4/2002 | Dorsey et al. | ............ | 52/506.05 |
| 2004/0203885 A1 * | 10/2004 | Quaid | ..................... | 455/456.1 |

* cited by examiner

*Primary Examiner*—Lester Kincaid
*Assistant Examiner*—Isaak R Jama
(74) *Attorney, Agent, or Firm*—Moazzam & Associates, LLC

(57) ABSTRACT

Synchronizing database files of a central node with database files of a local node in which the central node is coupled to the local node via a communication link. The communication link performance being continuously monitored via a periodic signal sent back and forth between the central node and local node. Information indicative of the files of the central database are integrated with the monitoring signal portion sent from the central node to the local node and a determination is made whether the files integrated with the monitoring signal corresponds with files of the local database via indications in the monitoring signal portion returned from the local node.

16 Claims, 3 Drawing Sheets

| MSC/Cell Value | MSCID | CELLID |
|---|---|---|
| 0 | 2020 | 24001 |
| 1 | 2020 | 24002 |
| 2 | 2020 | 24003 |
| ... | ... | ... |
| x | 2242 | 523243 |

AUDITING OF WIRELESS NETWORK NODE DATABASES

TECHNICAL FIELD OF THE INVENTION

The invention relates generally to telecommunications and, more particularly to auditing of node databases in a wireless telecommunication network.

BACKGROUND OF THE INVENTION

The popularity of wireless telephony has grown at an exponential rate over the past several years. As an increasing number of people use wireless telephones as a substitute for traditional wireline telephones, telecommunications service providers must be ready to seamlessly provide service features and facilities normally associated with wireline service to the users of wireless telephony services.

One important and government mandated service required in both wireline and wireless telephony is public safety administration services (also known as emergency or "911" services). The hallmark of 911 service is the ability of the emergency service personnel to view the address of a distressed caller while the call is ongoing. In wireline applications, 911 service is easily administered because the caller uses equipment associated with a fixed address or location. Indeed, the caller's address aids 911 personnel in identifying appropriate emergency services units to respond to the distressed caller's request. In resolving an emergency, the position information may be used by the emergency services network in a variety of ways. For example, it may be used to plot a point on a map, to provide the nearest known street address, or an input to navigation equipment in the emergency response vehicle.

Wireless telephony poses an entirely new challenge for emergency service administration. Due to the very nature of wireless telephony, a distressed caller may be using a mobile unit in any geographic region where wireless service is provided. The challenge for emergency personnel and wireless service providers is to pinpoint the location of a distressed caller so that appropriate emergency service personnel may be dispatched.

The Federal Communication Commission (FCC) has mandated that wireless telecommunication service providers include the capability to locate a mobile subscriber unit within a certain geographical area. Several technologies have emerged and are being developed to meet the government mandate, including, navigational systems such as the global positioning system GPS, wireless assisted GPS, angle of arrival, time difference of arrival, RF fingerprinting and enhanced forward link triangulation. These technologies offer various degrees of accuracy and technological superiority in locating a mobile subscriber unit. Concurrent with the emergence of these position determination technologies, several standards have emerged and are being developed for obtaining location information.

Position information may be delivered to the emergency services network in two basic ways: with the call as part of the call setup information or through a separate data service. The former is known as Call Associated Signaling (CAS) since the position information is delivered in the call signaling. The latter is NCAS and the messages delivered by the data service must be correlated with the call by parameters carried in the message. With NCAS, an Emergency Services Message Entity pulls the position information from the wireless network. Thus, the wireless network uses the above-mentioned positioning technologies to position a mobile subscriber unit.

The American National Standards Institute wireless standards committee (ANSI-41) examining the issues and technologies for meeting the FCC mandate (i.e., the wireless carrier must provide the coordinates of the mobile unit's position to a emergency call center) concluded that the basic functionality necessary for implementation should use non-call path associated signaling (NCAS) in order to meet the situational contingencies and be implemented in the intelligent network on a service control point.

The Telecommunication Industry Association (TIA) Ad Hoc Emergency Services (AHES) committee developed a standard, which would eventually become a joint standard for ANSI-41 and GSM deployments of wireless emergency services—the J-STD-036. The standard develops a reference network model to describe the functional partitioning in which the functions are divided among several functional entities or nodes based on traditional functional separations.

Many of these network nodes maintain databases for storing/correlating files identifying system resources needed for enabling mobile unit positioning. System resources can include mobile serving areas, controllers, and positioning equipment, for example. Successful communication between network nodes depends on accurate synchronization of files contained in the respective databases. This is particularly important in an emergency service networks. Therefore, a need exists for a method and system for auditing network node databases to effect accurate file synchronization.

SUMMARY OF THE INVENTION

Briefly described, in a first preferred form the present invention comprises a method for synchronizing database files of a central node with database files of a local node in which the central node is coupled to the local node via a communication link. The communication link performance being continuously monitored via a periodic signal sent back and forth between the central node and local node. A determination is made whether the files of each database are synchronized by passing information in the monitoring signal.

Moreover, information indicative of the central database files are integrated with the monitoring signal sent from the central node to the local node and a determination is made whether the files correspond with files of the local database via indications in the corresponding monitoring signal returned from the local node. The communication link can be a conventional IP link and the monitoring signal can be a conventional heartbeat signal.

Moreover, each database file is sequentially included in successive heartbeats of the monitoring signal such that each heartbeat includes information representing a different database file. Preferably, the central node is a Mobile Positioning Center (MPC) and the local node is a Position Determining Equipment (PDE) in a wireless emergency services network which includes a plurality of Mobile Switching Centers (MSC) and a plurality of Cells associated therewith and each database file is an identifier corresponding to a unique MSC and Cell combination. Moreover, one way of carrying out the invention is to include a mobile unit geographical position request corresponding to a MPC database file in a heartbeat signal and then determining whether the returned heartbeat signal received from the PDE indicates an error with the position request. An error in the position request can be assumed to indicate that the MPC file did not match a file in the PDE database. In addition, a report can be generated listing any MPC file which corresponds to a position request indicated with an error.

DETAILED DESCRIPTION OF THE INVENTION

The present invention is directed to systems for auditing node databases in a wireless telecommunication network in which the audits are in real time or near real time. "Wireless" refers to cellular, Personal Communication Services, and other commercial mobile radio services and does not apply to cordless telephones or private radio systems. Methods and systems envisioned by the present invention minimize errors propagated in emergency caller location inquires due to database synchronization deficiencies.

Figures 1, 2:
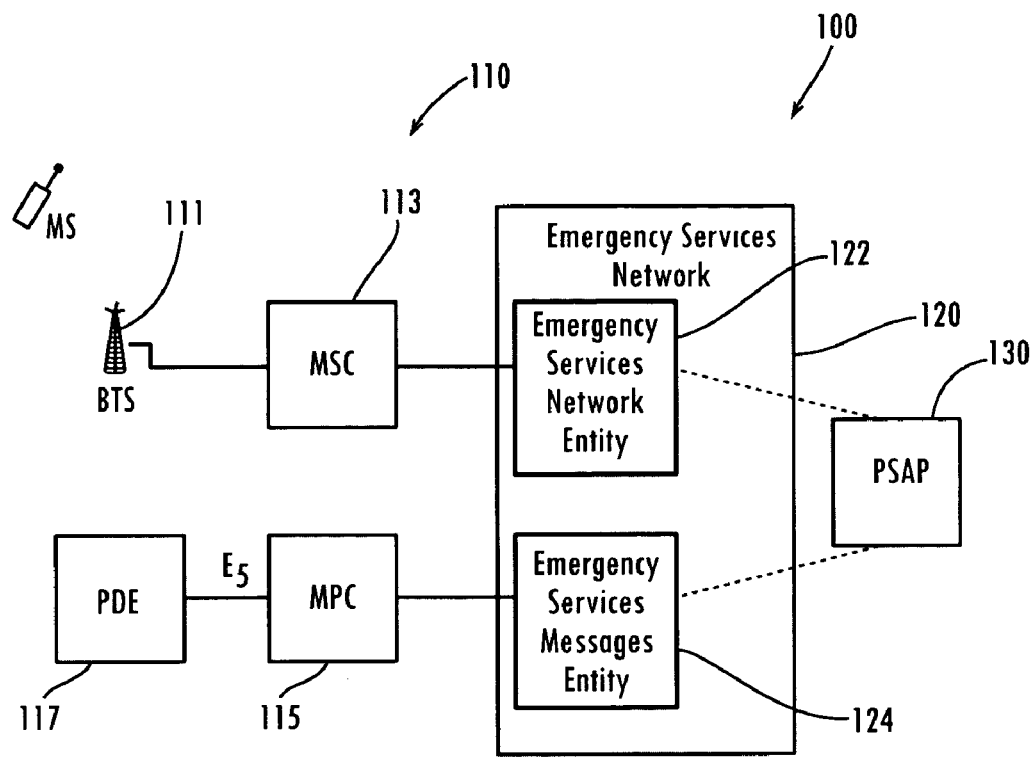
FIG. 1 shows a network representing a conventional ANSI-41 reference model for "network based" emergency call support services in accordance with the J-STD-036 standard.
FIG. 2 shows a conventional database arrangement for network nodes.

Referring now to FIG. 1, there is shown a network representing a simplified version of the ANSI-41 reference model 100 for "network based" emergency call support services in accordance with the J-STD-036 standard. "Network based" is a category of mobile positioning technology known in the wireless industry in which a conventional mobile network, in conjunction with network-based position equipment, is used to estimate the geographical position of a mobile station. The reference model 100 was developed to describe the functional partitioning in which the functions are divided among several functional entities or nodes based on traditional functional separations.

Although aspects of the present invention are directed at network nodes of the mobile network portion 110, a general understanding of the entire reference model 100 is helpful for a better understanding. The reference model 100 includes a mobile network portion 110, a public safety answering point (PSAP) 130 and an emergency services network portion 120.

The emergency services network portion 120 is functional for routing calls and service request between the mobile network portion 110 and the PSAP 130 via an emergency services message entity (ESME) that is conventionally functional for routing and processing the out-of-band messages related to emergency calls and an emergency services network entity (ESNE) that is conventionally functional for routing and processing the voice band portion of the emergency call. The PSAP 130 is the terminating end-point (i.e., operator) responsible for answering to emergency services calls and arranging the emergency services (e.g., fire, police, ambulance).

As above-mentioned, the mobile network portion 110 includes a conventional mobile network and positioning equipment. Typically, the mobile network includes several base station transceivers (BTS) 111 each serving a discrete geographical area or cell (which may be divided into several emergency zones) for communicating over a radio link with a mobile station (MS) making an emergency call. The mobile network also includes one or more mobile switching centers (MSC) 113 each associated with a select plurality of BTSs 111 (via appropriate hardware links). Thus, each MSC 113 is associated with a select plurality of cells. The MSC 113 is functional for providing conventional call management functions (i.e., setting up and tearing down connections for the call) and routing of emergency calls to the emergency services network portion 120.

The network-based position equipment includes position determining equipment (PDE) 117 devices functional for determining the geographic position of the MS when the mobile station user initiates a call or while the user is engaged in a call. Each PDE 117 is associated with a mobile position center (MPC) 115 that is functional for selecting the appropriate one or ones of a PDEs 117 to use for determining position. The MPC 115 is preferably a processor-based apparatus that uses stored computer programs to implement its functions in which aspects of the present invention can be implemented in computer programs. Alternatively, aspects of the present invention can be implemented with interface circuits, combination logic and/or sequential logic.

Summarizing the network entity relationship of the three network nodes (i.e., MSC 113, MPC 115, PDE 117) of the mobile network portion 110, each MSC 113 is associated with a plurality of cells. Further, the MSC 113 is assigned to only one MPC 115, but each MPC 115 may be associated with multiple MSCs 113. Additionally, each MPC 115 is associated with multiple PDEs 117 and each PDE 117 can be associated with multiple cells. The combinations of MSCs and cells serviced by a particular MPC 115 are contained in a database in the MPC 115 and in separate and independent databases in the associated PDEs 117.

In conventional operation, a 911 emergency call from the MS is routed to the MSC 113 which routes the 911 call to the emergency services network portion 120 for further routing to the appropriate PSAP 130. Along with the routed call, the MCS 113 includes identification of both the serving cell and MSC. The MCS 113 may also send this id information to its assigned MPC 115. Subsequently, the PSAP 130 may request or query mobile positioning information for the MS via the emergency services network portion 120, which pulls the position information from the MPC 115. The request incorporates information identifying the serving cell and MSC 113, and the MPC 115 correlates this information with that received from the MSC 113 for selecting which PDEs 117 to be used for determining the position of the MS.

Referring to FIG. 2 there is shown a table for illustrating a conventional database arrangement for the MPC 115 and PDE 117. The first column represents a list of numerical values each representing a MSC and one of the cells serviced by that MSC. The MSCs and cells each have their own assigned identification numbers, known in the wireless industry as MSCID and CELLID, respectively. Thus, each numerical value in the first column is correlated with a MSCID/CELLID combination. In this example, the value zero "0" represent the combination of MSC number 2020 and cell number 24001. As can be seen, MSC number 2020 may have several cell combinations.

The success of emergency caller location quires depends on the accuracy of MSC id and cell id information stored with the MPCs and PDEs. For example, if for any reason a PDE 117 does not recognize the MSCID/CELLID combination in a position request from a MPC 115, the precision of a location estimate will be adversely affected if it can be generated at all.

Thus, to maintain proper functionality, databases should be synchronized to contain the same id information. Synchronization is typically a process of inputting the MSCID and associated CELLID data manually into each database. To assure accuracy, synchronization should be performed whenever a new cell is added and/or re-configured, for example. As a practical matter, though synchronization is most often performed for the MPCs, it is not always performed on every PDE following a cell modification. This is due, in some part, to the fact that there are many more PDEs in the network than are MPCs. In addition, data entry errors can be made while updating network node databases.

In accordance with exemplary embodiments of the present invention, network node databases are proactively audited to provide proper synchronization of stored information. More specifically, database entries of the MPC 115 and PDE 117 are continuously compared in a real-time manner to determine if there are any discrepancies. Discrepancies can be noted in a daily log or other type of periodic report. The auditing is provided via standard protocols, interface connections and connection monitoring between the MPC 115 and PDE 117.

The J-STD-036 standard defines the protocols and messages used on the network interfaces between the reference model 100 network entities. The interface between the MPC 115 and the PDE 117 is known as the E5 interface. In practical deployment, the E5 interface is an Internet Protocol (IP) connection. However, one problem with IP connections is that long periods of silence can cause connection loss. To ensure interface stability, an application level heartbeat message is typically used between the MPC 115 and PDE 117 simply for monitoring the connection. Thus, the MPC 115 exchanges heartbeat signals (HB) with the PDE 117 for determining that the IP connection is active (i.e., functioning properly). When the MPC 115 or PDE 117 recognizes that the HB sequence has been interrupted, both nodes initiate interface termination and re-establishment procedures.

Figure 3:
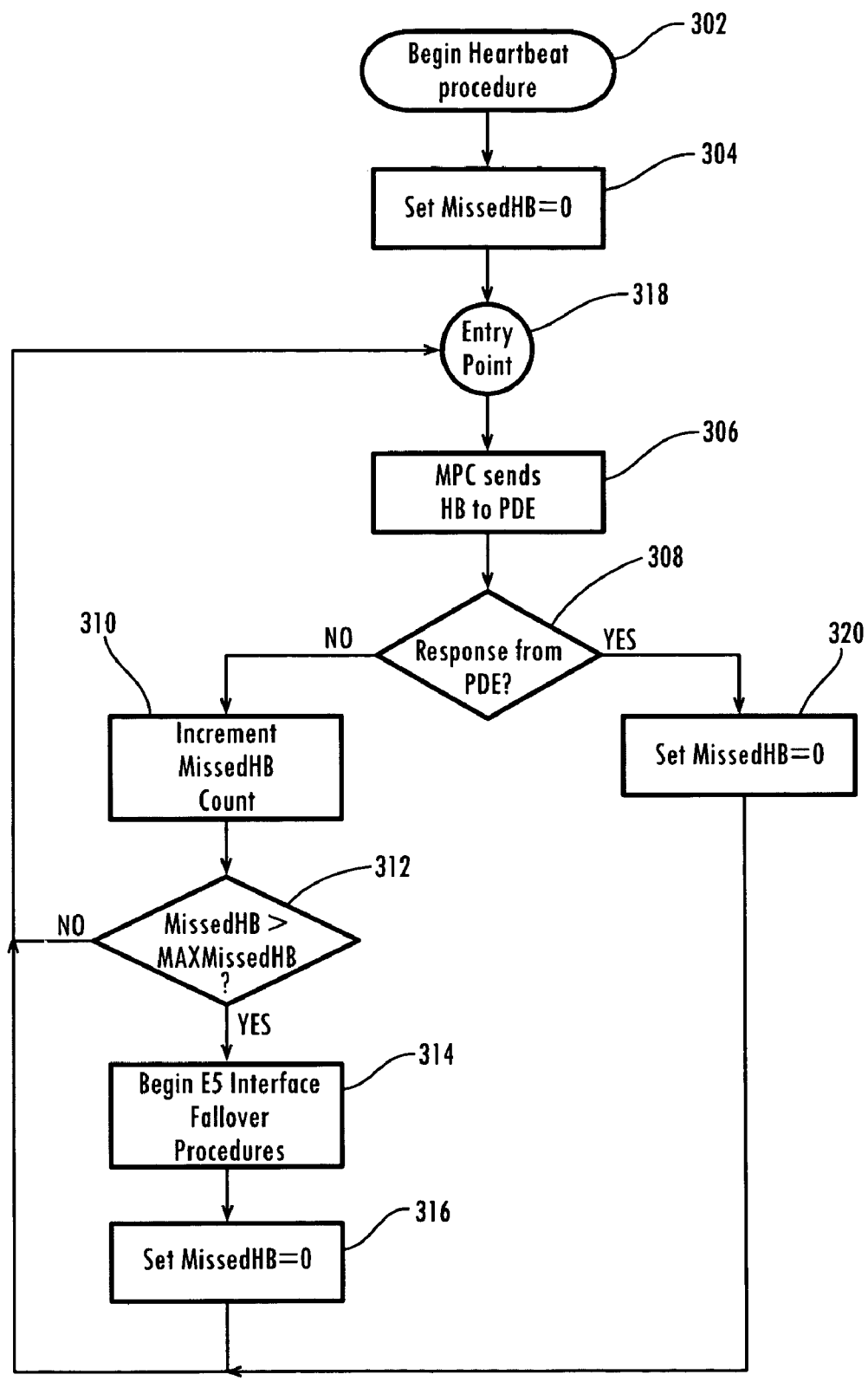
FIG. 3 shows a flow diagram illustrating a conventional heartbeat communication scheme.

Referring now to FIG. 3, there is shown a flow diagram more particularly illustrating the above-mentioned conventional HB communication scheme. The method is initiated with the beginning of the HB at step 302 followed by the "MissedHB" counter (step 304). MissedHB is a counter variable that represents the number of consecutive occurrences of missed HBs (i.e., no return HB from the PDE 117). Subsequently, the MPC 115 sends the HB (step 306) to the PDE 117 and awaits a corresponding HB response (step 308).

If a HB response is returned from the PDE 117 (step 308), the MissedHB count is set to zero and control is passed to the entry point (step 318) in anticipation of the next HB signal. If no HB response is returned from the PDE 117, the MissedHB count in incremented by one (step 310) and the new count is compared to the "MaxMissedHB" (step 312). MaxMissedHB is a parameter that is set to the highest acceptable number of consecutive missed HBs. If the MaxMissedHB count is exceeded, the appropriate system nodes initiate Interface termination and re-establishment procedures step (314) and the MissedHB is set back to zero (step 316) and control is passed to the entry point (step 318) of the flow diagram for preparation of the next HB signal. If the MaxMissedHB is not exceeded, control is passed to the entry point (step 318).

In accordance with a preferred embodiment of the present invention, database auditing is enabled by enhancing the above-mentioned conventional HB scheme. More specifically, functionality is enhanced by including database entries or files in a GPOSREQ(HB) signal between the MPC 115 and PDE 117. In other words, in accordance with the J-STD-036 standard, a HB signal is implemented by means of a predefined timed geo position request (GPOSREQ) signal from the MPC 115 to the PDE 117 with the request type (REQ-TYPE) parameter set to HB (i.e., Heartbeat) and further including a database file from the MPC 115 with the HB signal. The MPC 115 cycles through its database files (i.e., MSCID/CELLID combinations) including one entry in each HB signal sent to the PDE 117, each successive HB signal containing a different database entry. If the enhanced HB signal creates some type of error in the PDE's functionality, the PDE 117 returns an error indication in the HB signal. From an error indication, it can be assumed that the MPC database file was not recognized by the PDE 117. In the alternative, the geo position directive from the PDE 117 can be used to check database entries. Here, database files from the PDE 117 are included with the HB signal. The PDE 117 cycles through its database files including one entry in each HB signal sent to the MPC 115, each successive HB signal containing a different database entry. If this enhanced HB signal creates some type of error in the MPC's functionality, the MPC 115 returns an error indication in the HB signal. From an error indication, it can be assumed that the PDE database file was not recognized by the MPC 115.

Figure 4:
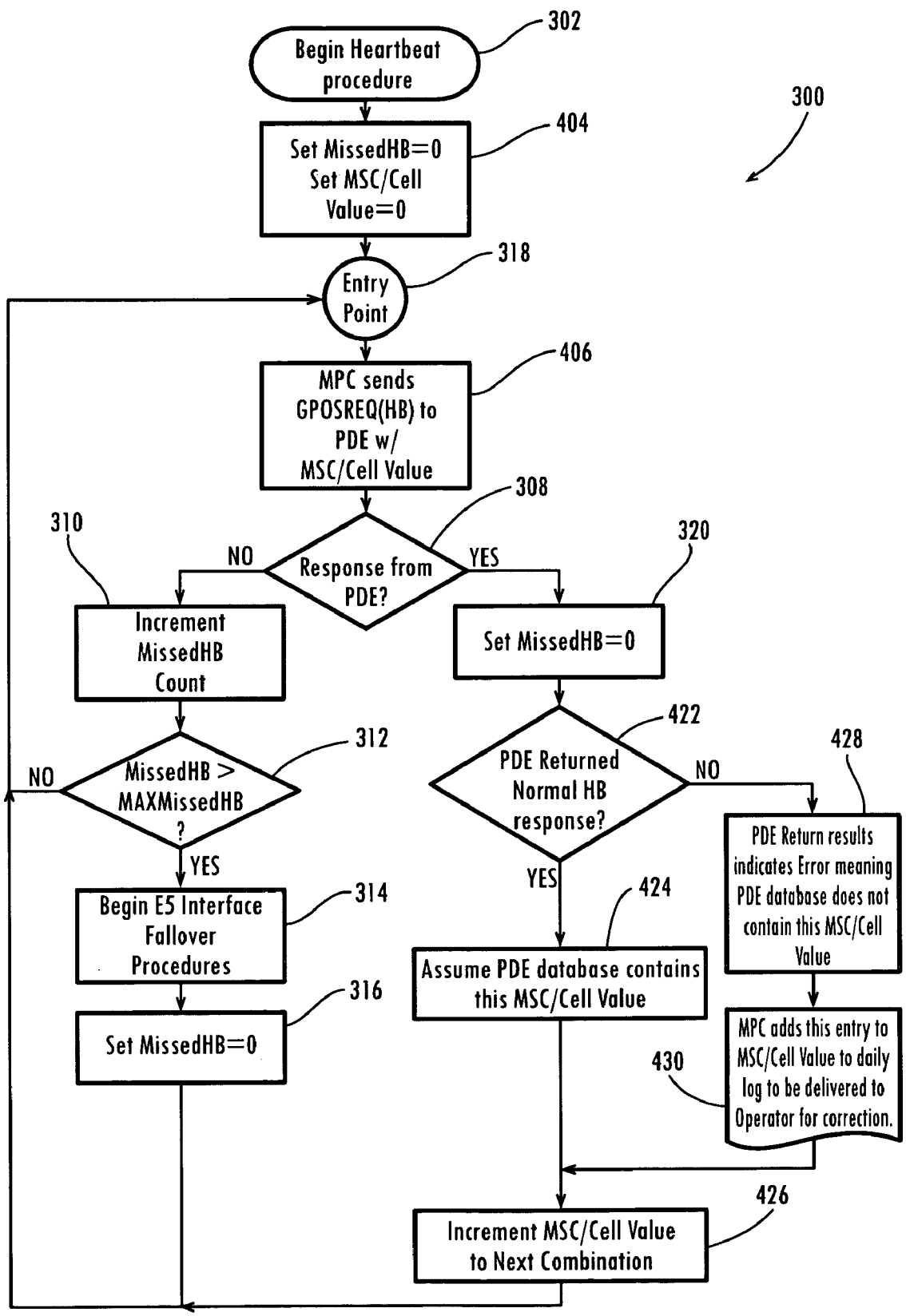
FIG. 4 shows a flow diagram illustrating an audit method in accordance with exemplary embodiments of the present invention.

Referring to FIG. 4 there is shown a flow diagram illustrating the inventive audit method. Following initiation of the HB (step 302), the MissedHB counter is set to zero and the MSCID/CELLID value from the MPC 115 database is set to zero (step 404). Subsequently, the MPC 115 sends the GPOSREQ(HB) with the current MSCID/CELLID value to the PDE 117 (step 406) and awaits the PDE's response (step 308).

If no response is received, the control passes to steps 310, 312, 314, 316 and 318 as described and shown in FIG. 3. However, if a response is received, the HB is set to zero (step 320) and a determination is made as to whether the response is "normal" (i.e., does it indicate any errors) (step 422). If a determination is made that the response is normal, the MPC 115 assumes the database entries match properly (step 424) and the MCEID/CELLID value is incremented to the next combination (step 426). Control is then passed to the entry point (step 318) in anticipation of the next HB.

If a determination is made that the response indicates an error, it is an indication that the PDE 117 database does not contain the current MSCID/CELLID value (step 428). Subsequently, the MPC 115 includes this entry in a problem log (step 430). The problem log can be an ASCII text based log file, for example, that the MPC 115 generates. The problem log contains unrecognized MSCID/CELLIDs and is deliverable to the system operator for review and/or correction. Following step 430, control is passed again to step 426 for incrementing the MSCID/CELLID value to the next combination. In a preferred embodiment, the above-described auditing method is embodied on computer-readable medium associated with the MPC 115.

Of course, it should be understood that the order of the steps and/or acts of the step or algorithms discussed herein may be accomplished in different order depending on the preferences of those skilled in the art. Furthermore, though the invention has been described with respect to a specific preferred embodiment, many variations and modifications will become apparent to those skilled in the art upon reading the present application.

The invention claimed is:

1. A method for synchronizing database files of a central node with database files of a local node in a network, wherein the central node is coupled to the local node via a communication link, the method comprising:

initiating a monitoring signal to monitor the communication link between the central node and the local node for reestablishing the communication link therebetween responsive to a determination that the communication link is performing incorrectly, the monitoring signal being a periodic heartbeat signal which includes an initial signal from the central node to the local node and a corresponding return signal from the local node to the central node, wherein information indicative of the central node database files are incrementally included with sequential heartbeat signals such that each heartbeat includes information representing a different file;

integrating information indicative of the files of the central node database with the monitoring signal;

determining whether the files integrated with the monitoring signal corresponds with files of the local node database via indications in the monitoring signal; and generating a report including those central node database files determined not to correspond with a file of the local database.

2. A method as claimed in claim 1 further including integrating, with the return signal, an indication of whether a central database file received with the corresponding initial signal corresponds with a local database file.

3. A method as claimed in claim 1 wherein an error indication is integrated with the return signal responsive to a determination that the indicated file integrated with the monitoring signal does not correspond with a file of the local database.

4. A method as claimed in claim 1 further including synchronizing those central node database files having an error indication.

5. A method as claimed in claim 1 wherein each file is an identifier corresponding to a unique combination of assets from the network.

6. A method as claimed in claim 1 wherein the network is a wireless emergency services network which includes a plurality of Mobile Switching Centers (MSC) and a plurality of Cells associated therewith and each file is an identifier corresponding to a unique MSC and Cell combination.

7. A method for auditing database files of a Mobile Position Center (MPC) and a Positioning Determining Equipment (PDE) in a wireless emergency services network, wherein the MPC is coupled to the PDE by a communication link which is monitored via a heartbeat signal, wherein the heartbeat signal includes an initial signal from the MPC to the PDE and a corresponding return signal from the PDE to the MPC, wherein information indicative of MPC files is incrementally included with sequential heartbeat signals such that each heartbeat includes information representing a different file, the method comprising:

concatenating data indicative of a position request corresponding to a MPC file in an initial signal of the heartbeat signal; and determining whether the return signal received from the PDE indicates an error with the position request; and generating a report of those MPC files corresponding to position requests having an error indication.

8. A method as claimed in claim 7 wherein an error indication with the position request is presumed to indicate that the MPC file does not correspond with a file in the PDE database.

9. A method as claimed in claim 7 further comprising concatenating data indicative of MPC database files incrementally with successive position request.

10. A method as claimed in claim 9 wherein each successive position request is included in successive heartbeat signals.

11. A method as claimed in claim 7 wherein the wireless emergency services network includes a plurality of Mobile Switching Centers (MSC) and a plurality of Cells associated therewith and each file corresponds to a unique MSC and Cell combination.

12. A computer program in a computer-readable medium for comparing database files of a Mobile Position Center (MPC) and a Positioning Determining Equipment (PDE) in a wireless emergency services network, wherein the wireless emergency services network includes a plurality of Mobile Switching Centers (MSC) and a plurality of Cells associated therewith and each database file corresponds to a unique MSC and Cell combination, and wherein the MPC is coupled to the PDE by a communication link which is monitored via a heartbeat signal, the computer program comprising:

a first code segment for including information indicative of a position request corresponding to a MPC file with the heartbeat signal;

a second code segment for determining whether the heartbeat signal received from the PDE indicates an error with the position request;

a third code segment for repeating the first code segment and second code segment for each MPC file, wherein information indicative of MPC files is incrementally included with sequential heartbeat signals such that each heartbeat includes information representing a different file; and a fourth code segment for generating an error report, wherein the report identifies the MPC file associated with a position request error.

13. A computer program as claimed in claim 12 wherein an error indication with the position request is presumed to indicate that the MPC file does not correspond with a file in the PDE database.

14. A computer program as claimed in claim 12 further comprising a fifth code segment for determining from indicators in the heartbeat signals received from the PDE which MPC files are not synchronized with the PDE database.

15. A method for synchronizing database files of a local node with database files of a central node in a network, wherein the local node is coupled to the central node via a communication link, the method comprising:

initiating a monitoring signal to monitor the communication link between the local node and the central node for reestablishing the communication link therebetween responsive to a determination that the communication link is performing incorrectly, the monitoring signal being a periodic heartbeat signal which includes an initial signal from the central node to the local node and a corresponding return signal from the local node to the central node, wherein information indicative of the central node database files are incrementally included with sequential heartbeat signals such that each heartbeat includes information representing a different file;

integrating information indicative of the files of the local node database with the monitoring signal;

determining whether the files integrated with the monitoring signal corresponds with files of the central node database via indications in the monitoring signal; and generating a report including those central node database files determined not to correspond with a file of the local database.

16. A method as claimed in claim 15 further including integrating, with the return signal, an indication of whether a local database file received with the corresponding initial signal corresponds with a central database file.

* * * * *